United States Patent
Balaguer

(10) Patent No.: US 6,207,902 B1
(45) Date of Patent: Mar. 27, 2001

(54) ELECTRICAL WIRING CABLE WITH COLOR CONTRAST ABRASION WEAR INDICATOR

(76) Inventor: Richard J. Balaguer, 1078 Groveland Pines, Ortonville, MI (US) 48462

( * ) Notice: Subject to any disclaimer, the term of this patent is extended or adjusted under 35 U.S.C. 154(b) by 0 days.

(21) Appl. No.: 09/283,260

(22) Filed: Apr. 1, 1999

(51) Int. Cl.[7] ............................. H01R 3/00; H01B 7/36
(52) U.S. Cl. ..................... 174/112; 439/488; 174/15.7
(58) Field of Search ......................... 174/110 R, 112, 174/117 F, 15.7, 136; 439/488

(56) References Cited

U.S. PATENT DOCUMENTS

| | | | |
|---|---|---|---|
| 3,505,916 | * | 4/1970 | Brandt . |
| 4,423,306 | * | 12/1983 | Fox .................................... 219/137.9 |
| 4,808,966 | * | 2/1989 | Ferlier et al. ......................... 338/214 |
| 5,228,478 | * | 7/1993 | Kleisle ................................. 138/104 |
| 5,719,353 | * | 2/1998 | Carlson et al. ......................... 174/28 |

* cited by examiner

*Primary Examiner*—Khiem Nguyen
(74) *Attorney, Agent, or Firm*—R. Tracy Crump

(57) ABSTRACT

An improvement to conventional electrical wiring that provides a visible indication of wear abrasion before an electrical hazard is created in high wear, high abrasion cable applications is disclosed. The improvement to conventional wiring cable construction is the use of contrasting colors between the extruded insulator and the outer jacket materials in the cable. When the outer jacket of the cable is worn down, cut or damaged, the underlying insulator of a contrasting color becomes visible against the outer jacket thereby indicating a hazard condition.

6 Claims, 2 Drawing Sheets

ELECTRICAL WIRING CABLE WITH COLOR CONTRAST ABRASION WEAR INDICATOR

This invention relates to an electrical wiring cable and has specific relevance to electrical wiring cable used in high wear, high abrasion applications.

BACKGROUND OF THE INVENTION

The construction of electrical wiring cable is well settled in the electrical and electronic arts. A wide variety of conductive and insulating materials have been used in a multitude of different configurations. The type of electrical wiring cable employed in any particular application is determined by the electrical and physical requirements and parameters of that particular application. Some wiring cable applications require greater shielding and insulation, while others require protecting the conductors and insulation from physical or chemical damage.

One common construction for electrical wiring cable comprises a number of electrical conductors composed of a single conductive wire or multiple stranded wires, an extruded insulator of nonconductive material enclosing the conductors, and an outer jacket or sheathing, which protects the conductors and extruded insulator from various physical and chemical damage. This type of electrical wiring cable has a wide range of electrical applications, including high voltage and high current power cable applications.

In many electrical applications, wiring is laid in a static environment, that is, once laid in its environment, the cable is exposed to limited movement (bending) and external contact. In a static environment, the physical damage that wiring cable was typically exposed to was severing or cuts in the jackets, sheathing and/or insulators caused by the cable being laid on or over sharp objects or caused by other similar types of damage in a static environment. Consequently, the physical requirement on the wiring cable with regard to durability and abrasion resistance generally has been of limited concern in conventional wiring cable construction.

However, durability and abrasion resistance has become an increasing concern for wiring cable construction used in dynamic applications, such as automated and robotic assembly systems. For example wiring cables used in articular robotic arms are subject to wear abrasions and damage caused by the wiring cables being physically rubbed against the articulated component of the robotic and other foreign objects, as well as being repeatedly bent and pulled as the arm moves. The new dynamic application of conventional wiring cable has placed increased importance on its flexibility, durability and abrasion resistance. Although improvements in the construction of wiring cables have been developed for these high wear, high abrasion applications, the problem of wear abrasions has not been fully addressed, since physical wear on wiring cable is inevitable in any dynamic application. Wear abrasions can occur on conventional wiring cables without notice. Heretofore, wear abrasions on wiring cables are not visibly detectable due to the coloration of the cable's outer jacket and insulators employed by conventional wiring cable constructions. Without visual indication or physical inspection, the wear and damage to the cable may go unnoticed, which eventually leads to electrical hazards and failure.

SUMMARY OF THE INVENTION

The improvement of this invention to the construction of conventional electrical wiring cable provides a visible indication of wear abrasion before an electrical hazard is created in high wear, high abrasion cable applications. The improvement to conventional wiring cable construction is the use of contrasting colors between the extruded insulator and the outer jacket materials in the cable. When the outer jacket of the cable is worn down, cut or damaged, the underlying insulator of a contrasting color becomes visible against the outer jacket thereby indicating a hazard condition.

Although a variety of conventional wiring cables have used jacketing, shielding and insulation materials with various color combinations, heretofore, the advantage of using a colored jacket and extruded insulators with contrasting colors to provide a means for visually indicating wear and damage to a cable's protective outer jacket and insulation in high wear, high abrasion application has been under appreciated. For example, automated resistance welding systems used in the automobile industry use conventional power cables mounted to articulated robot arms, and those cables have a single extruded insulator over three stranded conductors that are individually insulated by only a thin inner jacket (See FIG. 1). Due to the uniform color of the single extruded insulator, an abrasion can be worn down to the thin inner jacket before it is visibly noticed or discovered by routine inspection. The use of wiring cable with jacketing and insulators of contrasting color would eliminate this problem.

Accordingly, an advantage of this invention is that the use of electrical wiring cable with color contrasted jacketing and insulators provides a visual indication of wear abrasion before a hazard condition occurs.

Another advantage of this invention is that conventional wiring cable construction can be used for an unappreciated result by the use of contrasting colors between the outer jacketing and the inner extruded insulation.

Another advantage of this invention is that the use of the wiring cable with color contrasted jacketing and insulators easily allows electrical wiring cable to be visually monitored for replacement without close or timely inspection.

Other advantages will become apparent upon a reading of the following description.

BRIEF DESCRIPTION OF THE DRAWINGS

A preferred embodiment of the invention has been depicted for illustrative purposes only wherein.

DESCRIPTION OF THE PREFERRED EMBODIMENT

The preferred embodiment herein described is not intended to be exhaustive or to limit the invention to the precise form disclosed. It is chosen and described to best explain the invention so that others skilled in the art might utilize its teachings.

Figure 1:
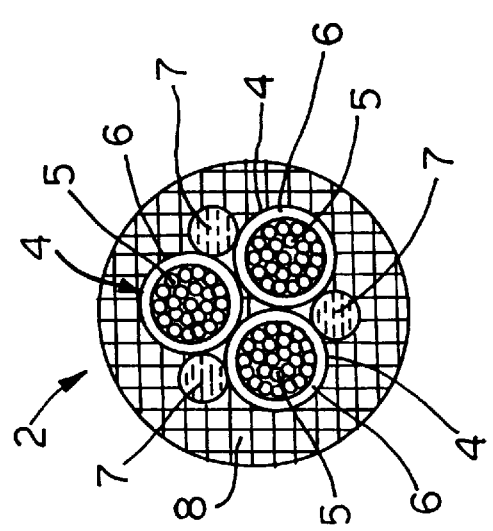
FIG. 1 is a sectional view of a conventional power cable wiring.

FIG. 1 shows a cross section of a conventional electrical wiring cable 2 that is well known in the prior art. Cable 2 is of the type generally used as a power cable in articulated robotic resistance welding devices employed in the automated industrial assembly systems of the automobile industry. As shown, cable 2 includes three individual sheathed conductors 4, three non-conductive fillers 7, and an extruded outer insulator 8. As is well known in the art, fillers 7 are used to position and hold conductors 4 in a uniform cross section configuration, and conductors 4 are formed of stranded twisted metal wire 5, such as copper. As shown in FIG. 1, insulator 8 is composed of an extrudeable, non-conductive material, such as polyvinyl chloride (PVC), polyethylene, or fluorocarbons. As shown, insulator 8 has a single uniform coloration, in this case yellow. With insulator 8 extruded over conductors 4 and fillers 7, wire strands 5 of conductors 4 are separated from the insulator 8 only by a thin insulating sheath 6. Consequently, due to the unitary construction of the cable, the insulator can be worn down to the thin conductor jacket easily without notice until a fault or hazard condition occurs.

Figure 2:
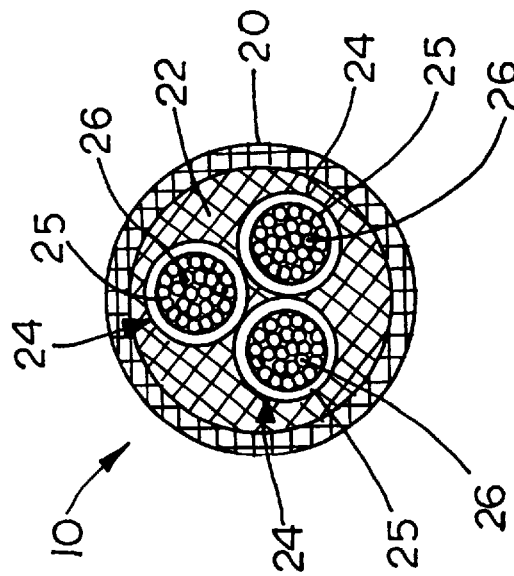
FIG. 2 is a sectional view of the cable wiring of this invention.
Figure 3:
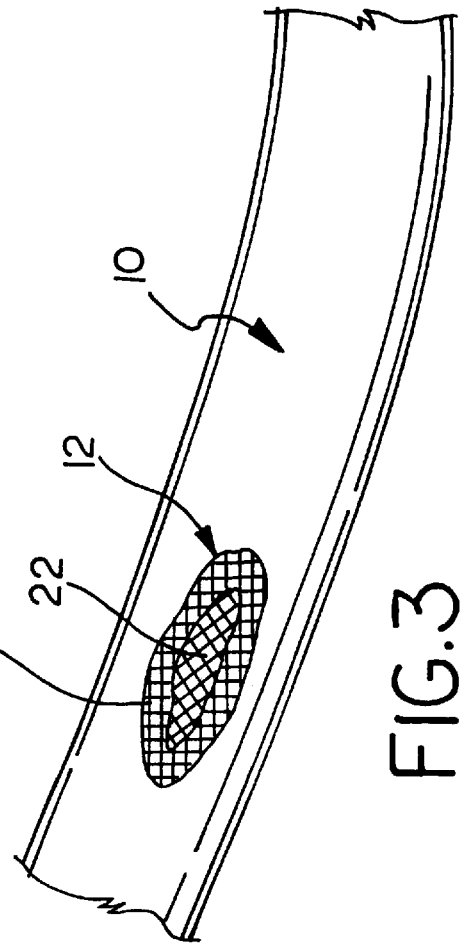
FIG. 3 is a perspective view of the cable wiring of this invention showing a portion of the outer covering worn away and exposing the inner core insulation.
Figure 4:
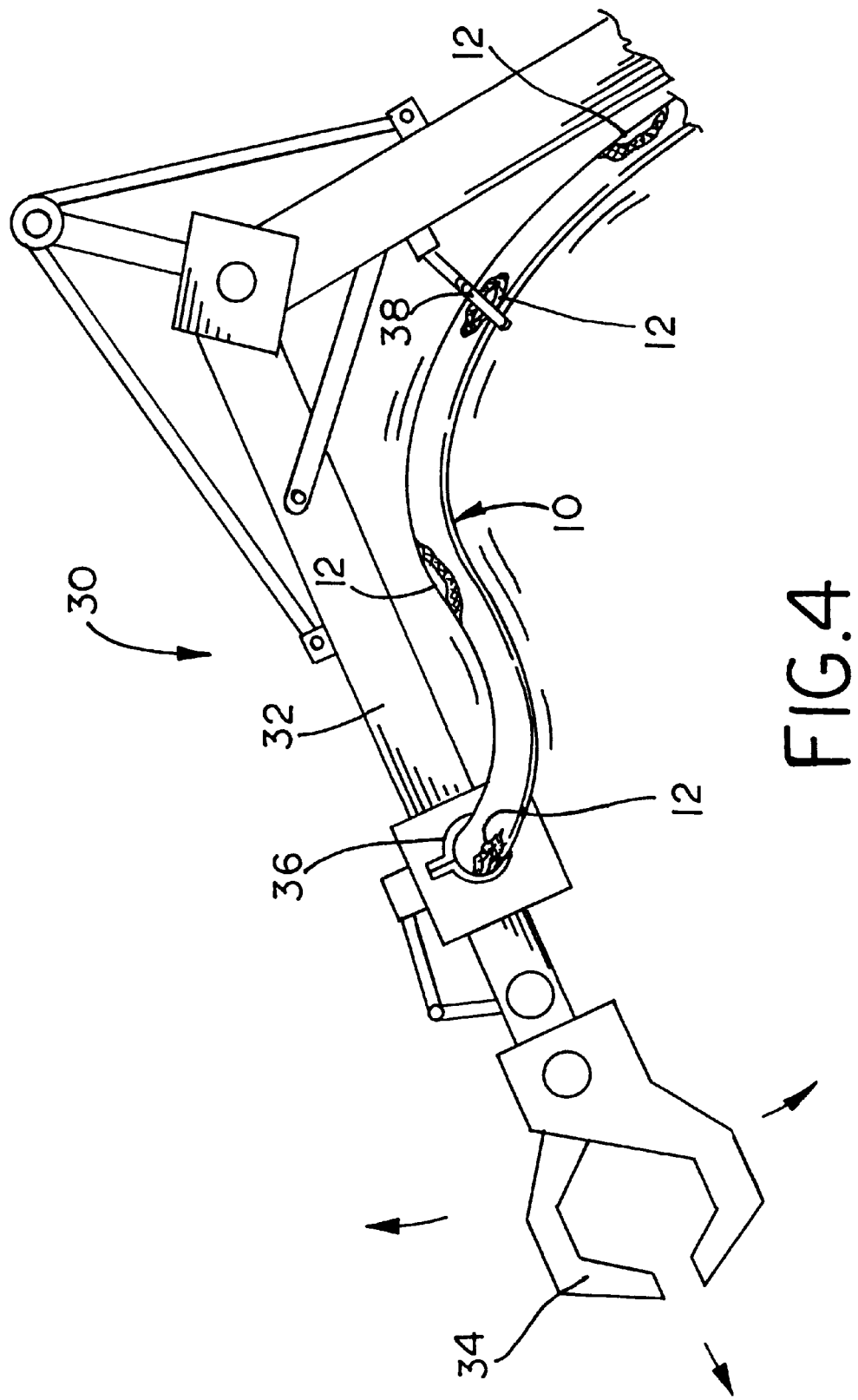
FIG. 4 is a perspective view of the cable wiring of this invention used in a simplified articulated robotic resistance welding apparatus.

FIGS. 2–4 show the electrical wiring cable 10 of this invention that employs a well known type of wire cable construction, but adds an element to produce the improvement, which has not been appreciated in the prior art. The electrical wiring cable of this invention is intended for use in applications where the electrical wiring cable is exposed to severe external mechanical or chemical wear, either due to repetitive bending, abrasive physical contact, or chemical deterioration. The construction of cable 10 allows the wear and abrasions to the wiring cable to be visibly noticeable, which provides a visual indication of dangerous electrical faults and hazard conditions.

As shown in FIG. 2, cable 10 includes three conductors 24, an extruded insulator 22 and an outer extruded jacket 20. Ideally, each conductor 24 is formed of a plurality of stranded conductive metal wire 26, such as copper. Each conductor 24 also has a thin non-conductive insulating sheathing 25. Insulator 22 is extruded directly over conductors 24. Insulator 22 may be composed of a suitable material, such as polyvinyl chloride (PVC), polyethylene, or fluorocarbons. Jacket 20 is extruded over insulator 22 and is composed of a suitable material to protect insulator 22 from secondary mechanical and chemical damage. Thus far, the basic construction of cable 10 does not change the scope of this invention. Cable 10 may employ any number or configuration of conductors whether of single wire or stranded wire, as well as any number or configuration of fillers, shielding, and sheathing without changing or diminishing the scope of this invention. The general construction of cable 10 shown in FIGS. 2–4 is provided solely for illustrative purposes. The improvement to cable 10 is found in the use of contrasting coloration of the materials used for jacket 20 and insulator 22. As depicted in FIGS. 3–4, jacket 20 is yellow and insulator 22 is orange. Although yellow and orange are depicted in the drawings, any highly visible contrast colors may be employed.

FIGS. 3 and 4 demonstrate the heretofore unappreciated advantage of the improved wiring cable of this invention. FIG. 4 shows a simplified illustration of cable 10 of this invention used as an electrical power cable in on articulated robotic resistance welding apparatus 30. Welding apparatus 30 includes an articulate robotic arm 32 and a welding head assembly 34 to its end distal end of arm 32. Cable 10 electrically connected to weld head assembly 34 by a connector 36 and secured to the outside of arm 32 by a band 38. The articulated movement of arm 32 continuously bends and moves cable 10 through band 38. The continuous sliding of cable 10 through band 38 wears down jacket 20 and creates wear-abrasions 12 in jacket 20 of cable 10. As shown in FIGS. 3 and 4, when abrasion 12 on jacket 20 is worn down by repetitive abrasions or damage to expose insulator 22, the contrasting color of insulator 22 becomes readily visible against the color of jacket 20. The visible color contrast between the colored materials of jacket 20 and insulator 22 provides a visual indication of the wear abrasion.

It is understood that the above description does not limit the invention to the details given, but may be modified within the scope of the following claims.

I claim:

1. An improved electrical wiring cable for use in a high wear, high abrasion electrical wiring application and including a conductor, an insulator covering the conductor, and an outer jacket covering the insulator, the improvement comprising:

the jacket being composed of a colored material and the insulator being composed of a colored material that is visibly contrasted to the color of the jacket, such that the color contrast between the materials of the jacket and insulator constitutes means for visually indicating a wear abrasion and physical damage to the cable, whereby the color contrast between the materials of the jacket and insulator is visible when the insulator is exposed through abrasions and cuts in the jacket caused by wear or physical damage to the cable and the jacket.

2. The improved electrical wiring cable of claim 1 wherein the color of the insulator is yellow and the color of the jacket is orange.

3. An improved electrical wiring cable for use as an electrical power cable in automated articulated resistance welding apparatus and including a conductor, an insulator covering the conductor, and an outer jacket covering the insulator, the improvement comprising:

means for visually indicating a wear abrasion and physical damages to the cable wherein the jacket is composed of a colored material and the insulator is composed of a colored material that is visibly contrasted to the color of the jacket such that the color contrast between the materials of the jacket and insulator is visible when the insulator is exposed through abrasions and cuts in the jacket caused by wear or physical damage to the cable and the jacket.

4. The improved electrical wiring cable of claim 3 wherein the color of the insulator is yellow and the color of the jacket is orange.

5. An improved electrical wiring cable for use in high wear, high abrasion electrical wiring applications and including a conductive part, a first covering part enclosing the conductive part, and a second covering part enclosing the first covering part, the improvement comprising:

the first covering part being composed of a colored material and the second covering part being composed of a colored material that is visibly contrasted to the color of the first covering part, such that color contrast between the materials of the first and second covering parts constitutes means for visually indicating a wear abrasion and physical damage to the cable, whereby the color contrast between the materials of the first and second covering parts is visible when the first covering part is exposed through abrasions and cuts in the second covering part caused by wear or physical damage to the cable and second covering part.

6. The improved electrical wiring cable of claim 5 wherein the color of the first covering part is yellow and the color of the second covering part is orange.

* * * * *